United States Patent
Abramson et al.

(10) Patent No.: US 8,442,202 B2
(45) Date of Patent: *May 14, 2013

(54) PRIVATE-BRANCH EXCHANGE THAT PROVIDES OUTGOING CALLING FOR AN OFF-PREMISES TERMINAL IN THE PRESENCE OF A THIRD-PARTY APPLICATION

(75) Inventors: Sandra R. Abramson, Freehold, NJ (US); Stephen M. Milton, Freehold, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1491 days.

This patent is subject to a terminal disclaimer.

(21) Appl. No.: 11/671,442

(22) Filed: Feb. 5, 2007

(65) Prior Publication Data

US 2008/0187123 A1  Aug. 7, 2008

(51) Int. Cl.
*H04M 3/54* (2006.01)
*H04M 3/58* (2006.01)

(52) U.S. Cl.
USPC ............................. 379/211.02; 379/212.01

(58) Field of Classification Search ............ 379/142.01, 379/211.02, 212.01, 142.07, 201.01, 265.01; 455/417, 445
See application file for complete search history.

(56) References Cited

U.S. PATENT DOCUMENTS

| | | | |
|---|---|---|---|
| 5,454,033 A | 9/1995 | Hahn et al. | |
| 5,502,762 A | 3/1996 | Andrew et al. | |
| 5,991,390 A | 11/1999 | Boonton | |
| 6,061,438 A | 5/2000 | Shen et al. | |
| 6,993,360 B2 * | 1/2006 | Plahte et al. | 455/555 |
| 7,319,864 B2 | 1/2008 | Jagadeesan et al. | |
| 8,160,228 B2 * | 4/2012 | Abramson et al. | 379/211.02 |
| 2003/0185375 A1 | 10/2003 | Albal | |
| 2004/0179660 A1 | 9/2004 | Sammon et al. | |
| 2004/0209640 A1 | 10/2004 | Urban et al. | |
| 2004/0234063 A1 | 11/2004 | Milton et al. | |
| 2006/0285671 A1 | 12/2006 | Tiruthani et al. | |

FOREIGN PATENT DOCUMENTS

| | | | |
|---|---|---|---|
| EP | 1679870 A3 | 7/2006 | |
| EP | 1814295 A2 | 8/2007 | |
| GB | 2422510 A | 7/2006 | |
| GB | 2446308 A | 8/2008 | |

(Continued)

OTHER PUBLICATIONS

Mr. Jared Stokes, "Applicatin No. GB0802123.0 Combined Search and Examination Report", May 1, 2008, Published in: UK.

(Continued)

*Primary Examiner* — Harry Hong
(74) *Attorney, Agent, or Firm* — Maldjian Law Group LLC; John P. Maldjian, Esq.; Alexander D. Walter, Esq.

(57) ABSTRACT

A telecommunications system is disclosed that enables a user to pair a desk set that is an extension of a private-branch exchange with a cell phone that is accessible via the Public Switched Telephone Network. One feature of the telecommunications system enables a call that is directed to the user's desk set to be automatically forwarded to the user's cell phone. This is advantageous to the user because it provides the illusion to the caller that the user is physically in her office when she is not necessarily there. A similar feature also provides the illusion when a third party initiates a call that connects the user's cell phone to a called party. Such a third party includes a computer-telephony integration (CTI) application in a telephone telemarketing center, which automatically places many outgoing telephone calls.

12 Claims, 9 Drawing Sheets

FOREIGN PATENT DOCUMENTS

| WO | 97/34437 A1 | 9/1997 |
|---|---|---|
| WO | 00/59190 A1 | 10/2000 |
| WO | 0135620 A1 | 5/2001 |
| WO | WO 01/35616 A2 | 5/2001 |
| WO | 2006055221 A2 | 5/2006 |
| WO | 2007109343 A3 | 9/2007 |

OTHER PUBLICATIONS

Stokes, Jared, "GB Application No. GB0802123.0 Examination Report Oct. 14, 2009", , Publisher: UK IPO, Published in: GB.

Stokes, Jared, "GB Application No. GB0802124.8 Examination Report Oct. 13, 2009", , Publisher: UK IPO, Published in: GB.

Stokes, Jared, "GB Application No. GB0802122.2 Examination Report Oct. 12, 2009", , Publisher: UK IPO, Published in: GB.

Stokes, Jared, "GB Application No. 0802123.0 Office Action May 15, 2009", , Publisher: UK IPO, Published in: GB.

Le, Karen L., "U.S. Appl. No. 11/671,444 Office Action Nov. 26, 2010", , Publisher: USPTO, Published in: US.

Great Britain Application No. 0802122.2 Office Action dated May 13, 2009, Avaya Inc., 2 pages.

Great Britain Application No. 0802122.2 Office Action dated May 28, 2008, Avaya Technology LLC, 5 pages.

Rampersad, Vedesh, "U.S. Appl. No. 11/671,441 Office Action Oct. 6, 2010", , Publisher: USPTO, Published in: US.

"GB Application No: GB0802122.2, Office Action dated May 27, 2008," Avaya Technology LLC, 5 pages.

Le, Karen L., "U.S. Appl. No. 11/671,442, Office Action dated Nov. 26, 2010," Publisher: USPTO, Published in: US.

Stokes, Jared, "GB Application No: GB0802124.8, Combined Search and Examiners Report dated Apr. 28, 2008," Published in: GB.

Stokes, Jared, "International Application No: 0802124.8, Office Action dated May 15, 2009," Published in: GB.

Abramson et al., "U.S. Appl. No. 11/671,444, Office Action dated Nov. 26, 2010," Publisher: USPTO, Published in: US, 30 pages.

* cited by examiner

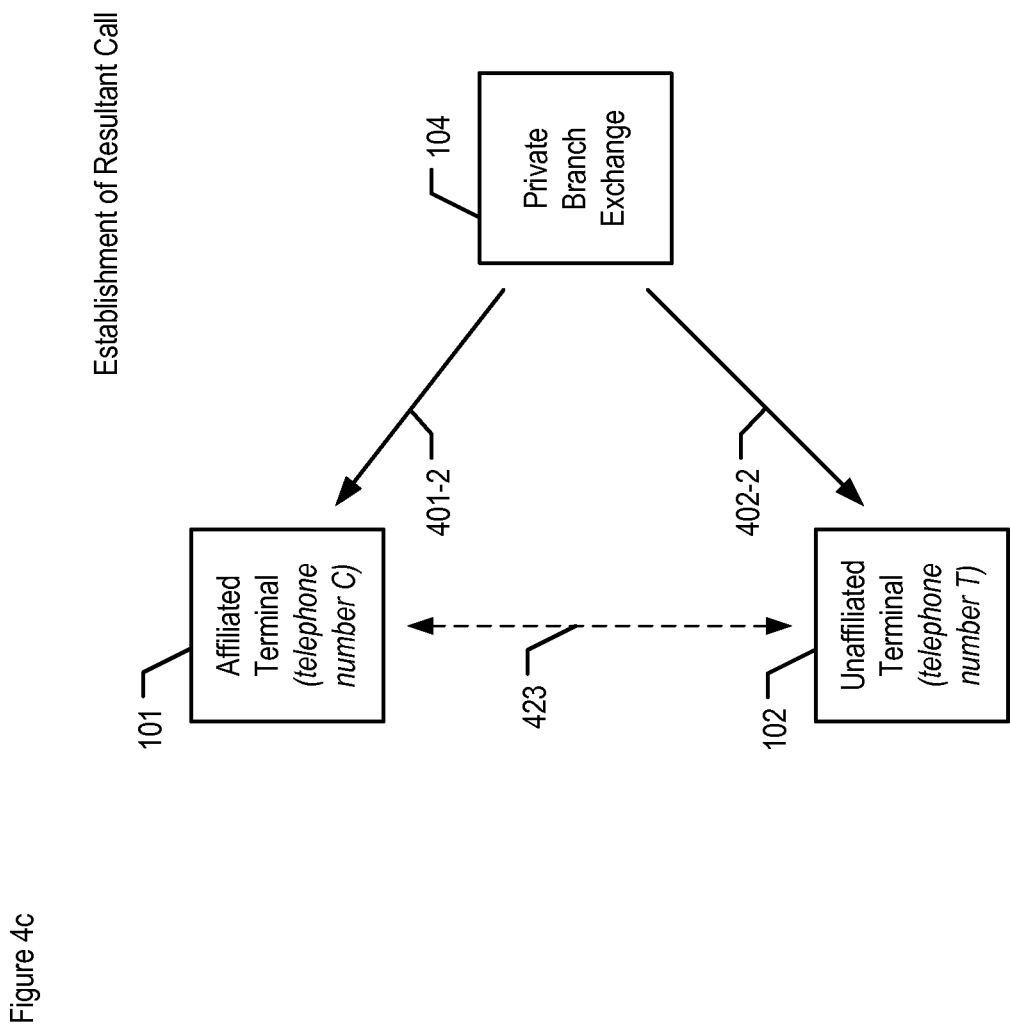

PRIVATE-BRANCH EXCHANGE THAT PROVIDES OUTGOING CALLING FOR AN OFF-PREMISES TERMINAL IN THE PRESENCE OF A THIRD-PARTY APPLICATION

FIELD OF THE INVENTION

The present invention relates to telecommunications in general, and, more particularly, to computer-telephony integration.

BACKGROUND OF THE INVENTION

A business that desires to provide employees at one location with telephones has, in general, two options. First, the business can acquire one telephone and one telephone line per employee from the telephone company. Second, the business can acquire one telephone per employee, a small number of telephone lines from the telephone company, and a piece of equipment that enables the employee's telephones to share the small number of telephone lines. In general, the second option is substantially less expensive than the first option, and the piece of equipment that enables the employees' telephones to share the small number of telephone lines is called a "private-branch exchange" or "PBX." Private-branch exchanges are also capable of providing valuable telecommunications features to their users.

SUMMARY OF THE INVENTION

The present invention enables a valuable capability of a telecommunications system. In the prior art, one feature of a telecommunications system enables a user to pair a desk set that is an extension of a private-branch exchange with a cell phone that is accessible via the Public Switched Telephone Network. The feature enables a call that is directed to the user's desk set to be automatically forwarded to the user's cell phone. This is advantageous to the user because it provides the illusion to the caller that the user is physically in her office when she is not necessarily there.

A similar feature enables the user to place a call from the cell phone to called party and have the telephone number of the desk set be the caller-ID for the call rather than the telephone number of the cell phone. This is advantageous to the user because it provides the illusion to the called party that the user is physically in her office when she is not necessarily there.

The illustrative embodiment of the present invention also provides the referred-to illusion, but does so when a third party initiates a call that connects the user's cell phone to the called party. Such a third party includes a computer-telephony integration (CTI) application in a telephone telemarketing center, which automatically places many outgoing telephone calls. In the prior art, when a third party initiated a call that connected the user's cell phone to a called party, the called party saw the user's cell phone number as the caller-ID. This would give the called party the telephone number of the user's cell phone, which is personal information that the user would prefer to keep private.

Third-party CTI applications are often not inherently integrated with some or all of the features provided by the co-existing private-branch exchanges. The illustrative embodiment enables such CTI applications to interwork with legacy private branch exchanges or other equipment.

The illustrative embodiment comprises allocating, from a pool of ports, a port P that is capable of emulating a telephone extension; and establishing a resultant call between a telephone number T and a telephone number C while transmitting a telephone number D as the calling-party number to the telephone number T; wherein the telephone number C is associated with the telephone number D in a data structure; wherein the telephone number D is within the address space of a private-branch exchange; and wherein the resultant call is based on at least one precursor call having been made that includes port P.

BRIEF DESCRIPTION OF THE DRAWINGS

FIGS. 4a, 4b, and 4c depict graphs of the salient components of the precursor calls and resultant calls.

DETAILED DESCRIPTION

Figure 1:
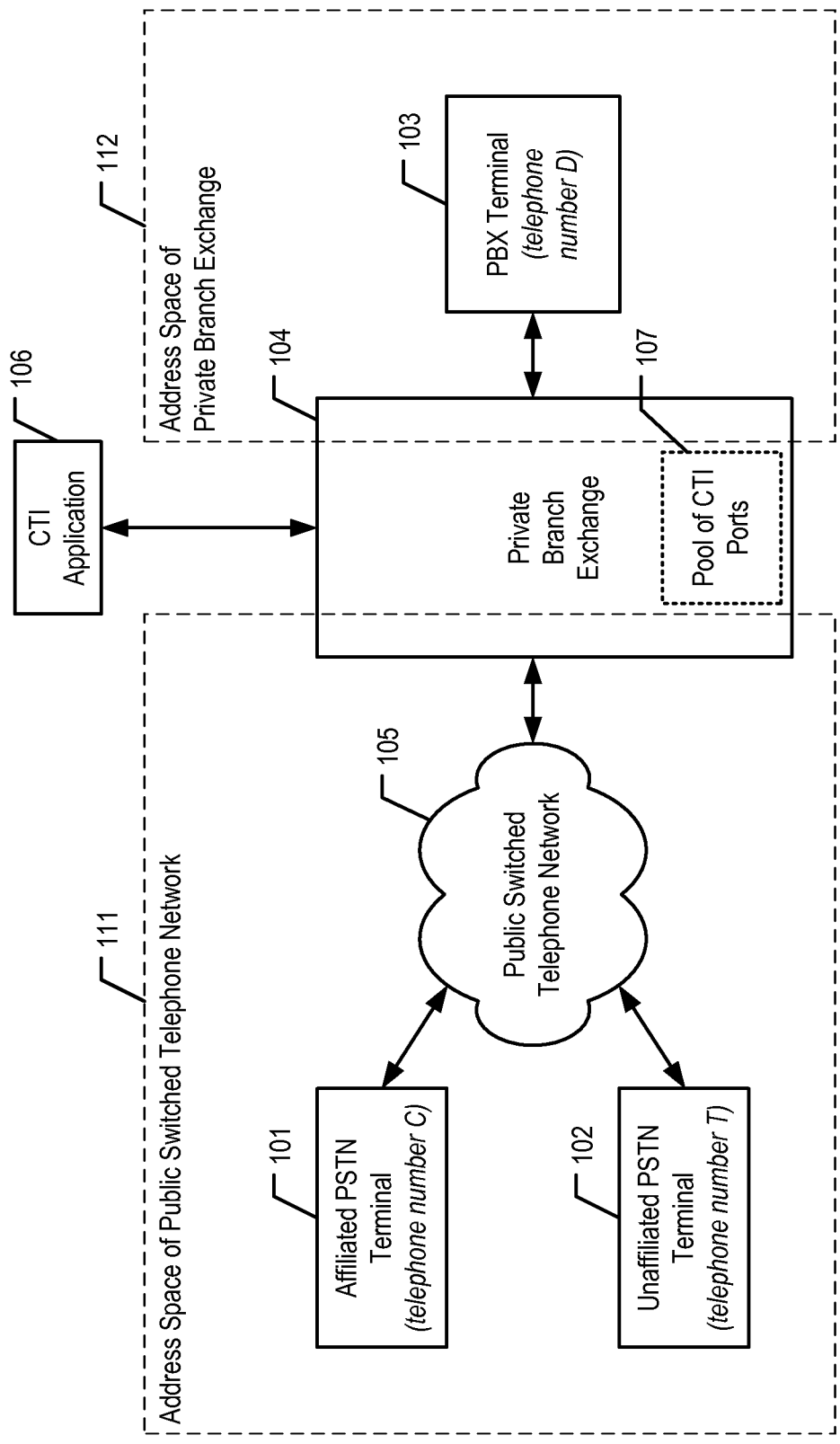
FIG. 1 depicts a schematic diagram of the salient components of telecommunications system 100 in accordance with the illustrative embodiment of the present invention.

Telecommunications System 100—FIG. 1 depicts a schematic diagram of the salient components of telecommunications system 100 in accordance with the illustrative embodiment of the present invention. Telecommunications system 100 comprises affiliated PSTN terminal 101, unaffiliated PSTN terminal 102, private-branch exchange (PBX) terminal 103, private-branch exchange (PBX) telephone system 104, Public Switched Telephone Network 105, and computer-telephony integration (CTI) application 106 interconnected as shown.

Although the illustrative embodiment comprises one affiliated PSTN telecommunications terminal, one unaffiliated PSTN telecommunications terminal, and one PBX telecommunications terminal, it will be clear to those skilled in the art, after reading this disclosure, how to make and use alternative embodiments of the present invention that comprise any number of affiliated PSTN telecommunications terminals, unaffiliated PSTN telecommunications terminals, and PBX telecommunications terminals.

Affiliated PSTN terminal 101 is a telecommunications terminal that corresponds to telephone number C in address space 111 of Public Switched Telephone Network 105. Terminal 101 is off-premises in relation to the on-premises enterprise region served by PBX telephone system 104. It will be clear to those skilled in the art, after reading this specification, how to make and use alternative embodiments of the present invention in which affiliated PSTN terminal 101 corresponds to a telephone number in the address space of a private branch exchange, such as, for example and without limitation, address space 112 of private branch exchange 104. In accordance with the illustrative embodiment, affiliated PSTN terminal 101 is a wireless terminal (e.g., cellular telephone, etc.). It will be clear to those skilled in the art, after reading this disclosure, how to make and use alternative embodiments of the present invention in which affiliated PSTN terminal 101 is a wireline terminal. It will be clear to those skilled in the art how make and use affiliated PSTN terminal 101.

Unaffiliated PSTN terminal 102 is a telecommunications terminal that corresponds to telephone number T in address space 111 of Public Switched Telephone Network 105. It will be clear to those skilled in the art, after reading this disclosure, how to make and use alternative embodiments of the present invention in which unaffiliated PSTN terminal 102 corresponds to a telephone number in the address space of a private branch exchange, such as, for example and without limitation, address space 112 of private branch exchange 104. In accordance with the illustrative embodiment, unaffiliated PSTN terminal 102 is a wireless terminal (e.g., cellular telephone, etc.). It will be clear to those skilled in the art, after reading this disclosure, how to make and use alternative embodiments of the present invention in which unaffiliated PSTN terminal 102 is a wireline terminal. It will be clear to those skilled in the art how to make and use unaffiliated PSTN terminal 102.

PBX terminal 103 is a telecommunications terminal that corresponds to telephone number D in address space 112 of private branch exchange 104. It will be clear to those skilled in the art, after reading this disclosure, how to make and use alternative embodiments of the present invention in which PBX terminal 103 corresponds to a telephone number in address space 111 of the Public Switched Telephone Network or the address space of another private branch exchange. In accordance with the illustrative embodiment, terminal 103 is a wireline terminal. It will be clear to those skilled in the art, after reading this disclosure, how to make and use alternative embodiments of the present invention in which terminal 103 is a wireless terminal. It will be clear to those skilled in the art how to make and use terminal 103.

Private-branch exchange 104 is a switch that provides telecommunications service to PBX terminal 103. Private branch exchange 104 comprises a data structure that associates the telephone number that corresponds to the PBX terminal 103 with the telephone number that corresponds to affiliated terminal 101. An example of such a data structure is depicted in Table 1.

TABLE 1

Data Structure That Associates the Telephone Number That Corresponds to PBX Terminal 103 with the Telephone Number That Corresponds to Affiliated Terminal 101

| Telephone Number That Corresponds to PBX Terminal 103 | Telephone Number That Corresponds to Affiliated Terminal 101 |
| --- | --- |
| D | C |

Although the illustrative embodiment associates one pair of telephone numbers, it will be clear to those skilled in the art, after reading this disclosure, how to make and use alternative embodiments of the present invention that associate any number of pairs.

Private-branch exchange 104 further comprises call-resource pool 107, which in turn comprises a plurality of CTI ports. It will be clear to those skilled in the art, after reading this disclosure, how to make and use embodiments of the present invention that comprise any number of CTI ports. Each port P is a logical point of connection that is capable of emulating a telephone extension, at least in the sense that within private-branch exchange 104, a call can be placed to a port, placed from a port, put on hold at a port, or transferred to or from a port. The particular telephone extension that a given port emulates might be known only to CTI application 106 and to private-branch exchange 104 itself, but not necessarily to any other device in system 100. At least one of CTI application 106 and private-branch exchange 104 is able to monitor the busy/idle status of each port P.

As those who are skilled in the art will appreciate, provisioning a greater number of ports will tend to result in a lower blocking level in the handling of calls, but can require additional resources with an associated additional cost. It will be clear to those skilled in the art how to determine an optimal provisioning of ports, for a given blocking level versus cost tradeoff. Additionally, it will be clear to those skilled in the art how to provision and administer the ports of pool 107.

In accordance with the illustrative embodiment, the operation of private-branch exchange 104 and PBX terminal 103 can be directed by computer-telephony integration application 106 in well-known fashion. The details of how to make and use private-branch exchange 104 are described in detail below and in the following drawings.

Public Switched Telephone Network 105 is the public telephone network. It will be clear to those skilled in the art how to make and use Public Switched Telephone Network 105.

Computer-telephony integration (CTI) application 106 is a combination of hardware and software that directs the operation of private-branch exchange 104 and PBX terminal 103. In particular, the CTI application provides the functionality described in detail below and in the accompanying figures. It will be clear to those skilled in the art, after reading this disclosure, how to make and use alternative embodiments of the present invention, in which CTI application 106 is absent and its functionality is performed by private-branch exchange 104 or by a natural person or by a combination of private-branch exchange 104 and by a natural person.

In accordance with the illustrative embodiment, CTI application 106 runs on an independent, general-purpose processor. It will be clear to those skilled in the art, after reading this disclosure, how to make and use alternative embodiments of the present invention in which CTI application 106 runs on an adjunct processor of private-branch exchange 104, a component of one or more of the terminals of telecommunication system 100, or on a special-purpose processor. The details of how to make and use CTI application 106 are described in detail below and in the following drawings.

Figure 2:
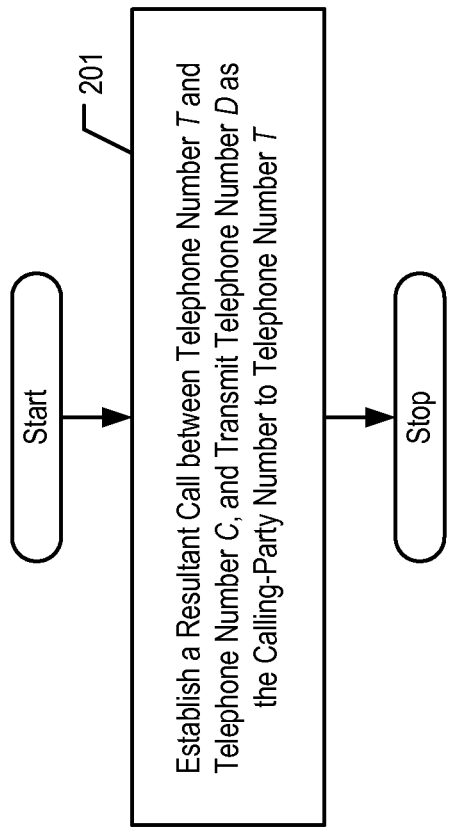
FIG. 2 depicts a flowchart of the salient task performed by the illustrative embodiment of the present invention.

Operation of the Illustrative Embodiment—FIG. 2 depicts a flowchart of the salient task performed by the illustrative embodiment of the present invention.

Task 201 comprises establishing a resultant call between telephone number T and telephone number C while transmitting telephone number D as the calling party number to telephone number T. The details of how to perform task 201 are described in detail below and with respect to the following drawings.

Figure 3:
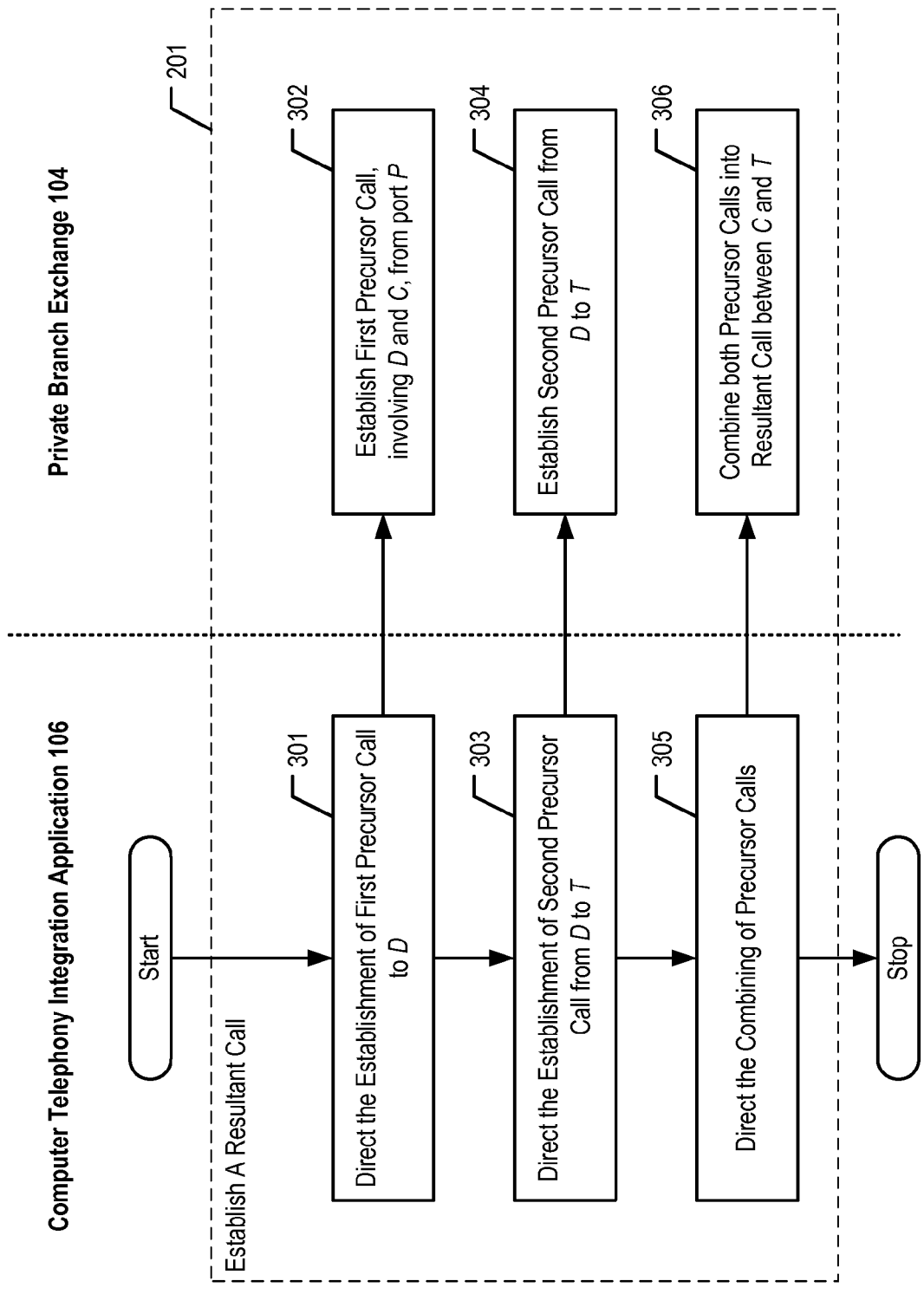
FIG. 3 depicts a flowchart of the salient tasks of task 201 in accordance with the illustrative embodiment of the present invention.

Establish Resultant Call—FIG. 3 depicts a flowchart of the salient tasks of task 201 in accordance with the illustrative embodiment of the present invention.

At task 301, CTI application 106 directs private-branch exchange 104 to establish a first precursor call to telephone number D from a CTI port, and to enable the extending of the call to the telephone number of the affiliated PSTN terminal (i.e., telephone number C). The details of task 301 are described in detail below and in the accompanying figures.

Figure 4A:
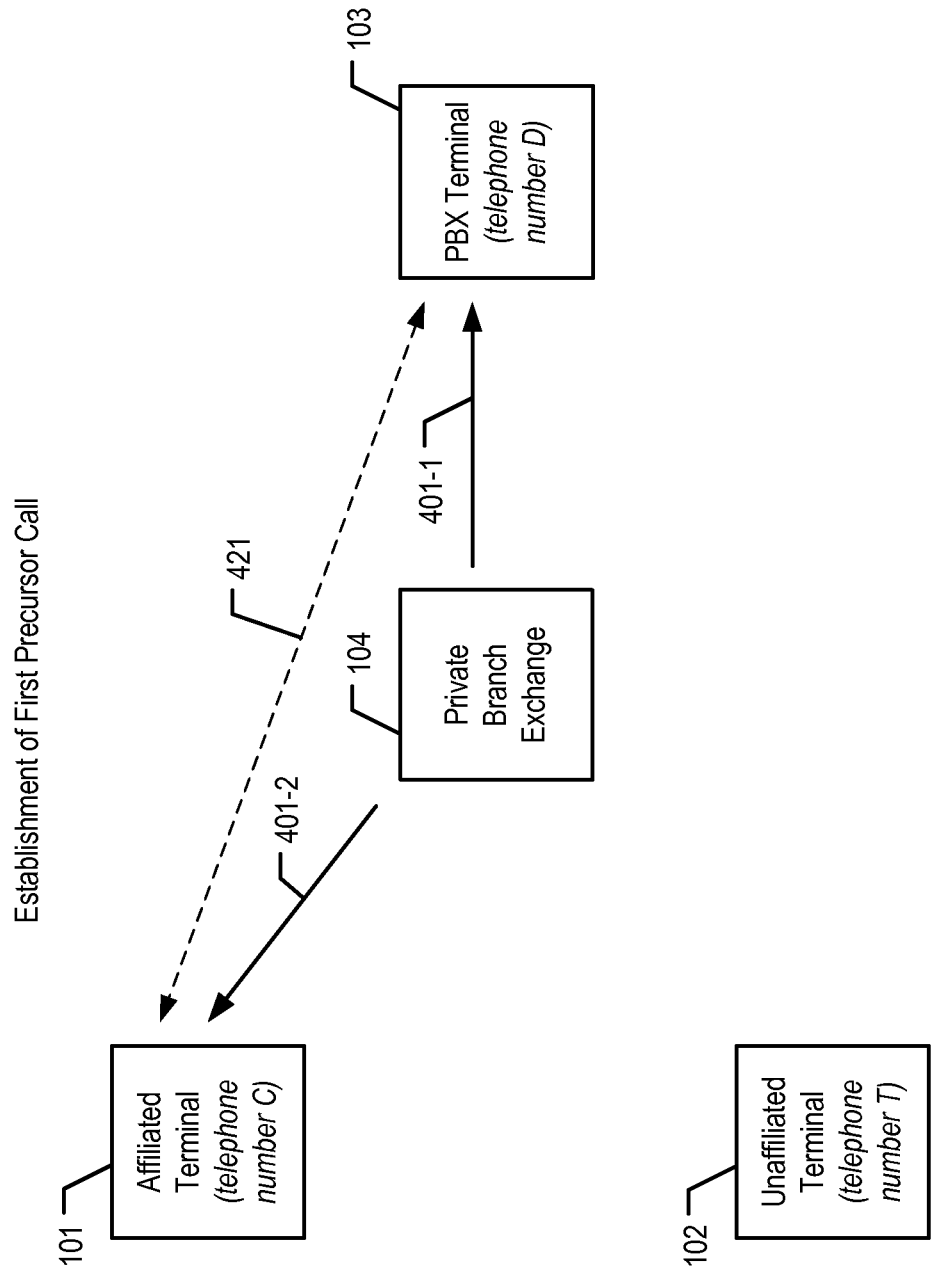

In response to task 301, private-branch exchange 104 establishes at task 302 the first precursor call that includes telephone number D and telephone number C (i.e., that has D and C as parties to the call). FIG. 4a depicts a graph of the salient components of first precursor call 421, which comprises connection 401-1 and connection 401-2 from port P. The details of task 302 are described in detail below and in the accompanying figures.

At task 303, CTI application 106 directs private-branch exchange 104 to establish a second precursor call from telephone number D to telephone number T. In accordance with the illustrative embodiment, task 303 is distinct from task 301. It will be clear to those skilled in the art, however, after reading this disclosure, how to make and use alternative embodiments of the present invention in which tasks 301 and 303 are combined or concurrent or performed in the opposite order. It will be clear to those skilled in the art how to make and use embodiments of the present invention that accomplish task 303.

Figure 4B:
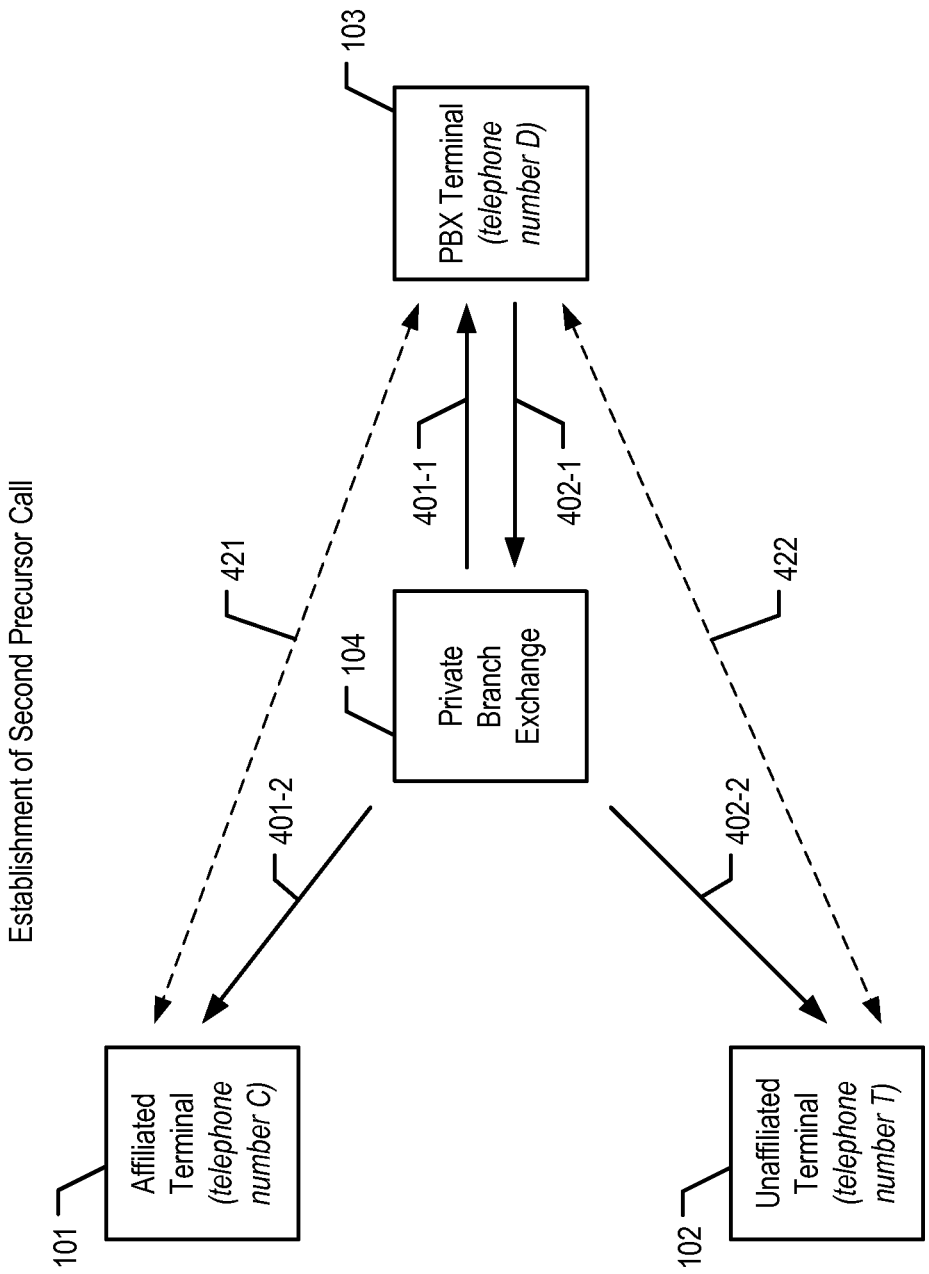

In response to task 303, private-branch exchange 104 establishes at task 304, the second precursor call from telephone number D to telephone number T. FIG. 4*b* depicts a graph of the salient components of first precursor call 421 and second precursor call 422, which comprises connection 402-1 and connection 402-2. In accordance with the illustrative embodiment, task 302 is performed before task 304. It will be clear to those skilled in the art, after reading this specification, how to make and use alternative embodiments of the present invention in which task 302 and task 304 are performed concurrently or in the opposite order. It will be clear to those skilled in the art how to make and use embodiments of the present invention that accomplish task 304.

At task 305, CTI application 106 directs private-branch exchange 104 to combine the first precursor call and the second precursor call to generate a resultant call between telephone number C and telephone number T while transmitting telephone number D as the calling party number to telephone number T. In accordance with the illustrative embodiment, task 305 is distinct from task 301 and task 303. It will be clear to those skilled in the art, after reading this disclosure, how to make and use alternative embodiments of the present invention in which task 301, task 303, and task 305 are combined or concurrent or performed in any order. It will be clear to those skilled in the art how to make and use embodiments of the present invention that accomplish task 305.

In response to task 305, private-branch exchange 104 combines, at task 306, the first precursor call and the second precursor call to generate the resultant call between telephone number C and telephone number T while transmitting telephone number D as the calling party number to telephone number T. In accordance with the illustrative embodiment, the combination of the first precursor call and the second precursor call results in two-party resultant call 423 comprising connection 401-2 and connection 402-2, as depicted in FIG. 4*c*. Task 306 is described in detail below and in the accompanying figures.

It will be clear to those skilled in the art, after reading this specification, how to make and use alternative embodiments of the present invention in which the combination of the first precursor call and the second precursor call results in a conference call, in which telephone number D remains bridged on the resultant call that also involves telephone numbers C and T. In any event, resultant call 423 can later be transferred to telephone number D, if in fact telephone number D is not bridged on the call from the beginning.

Figure 5:
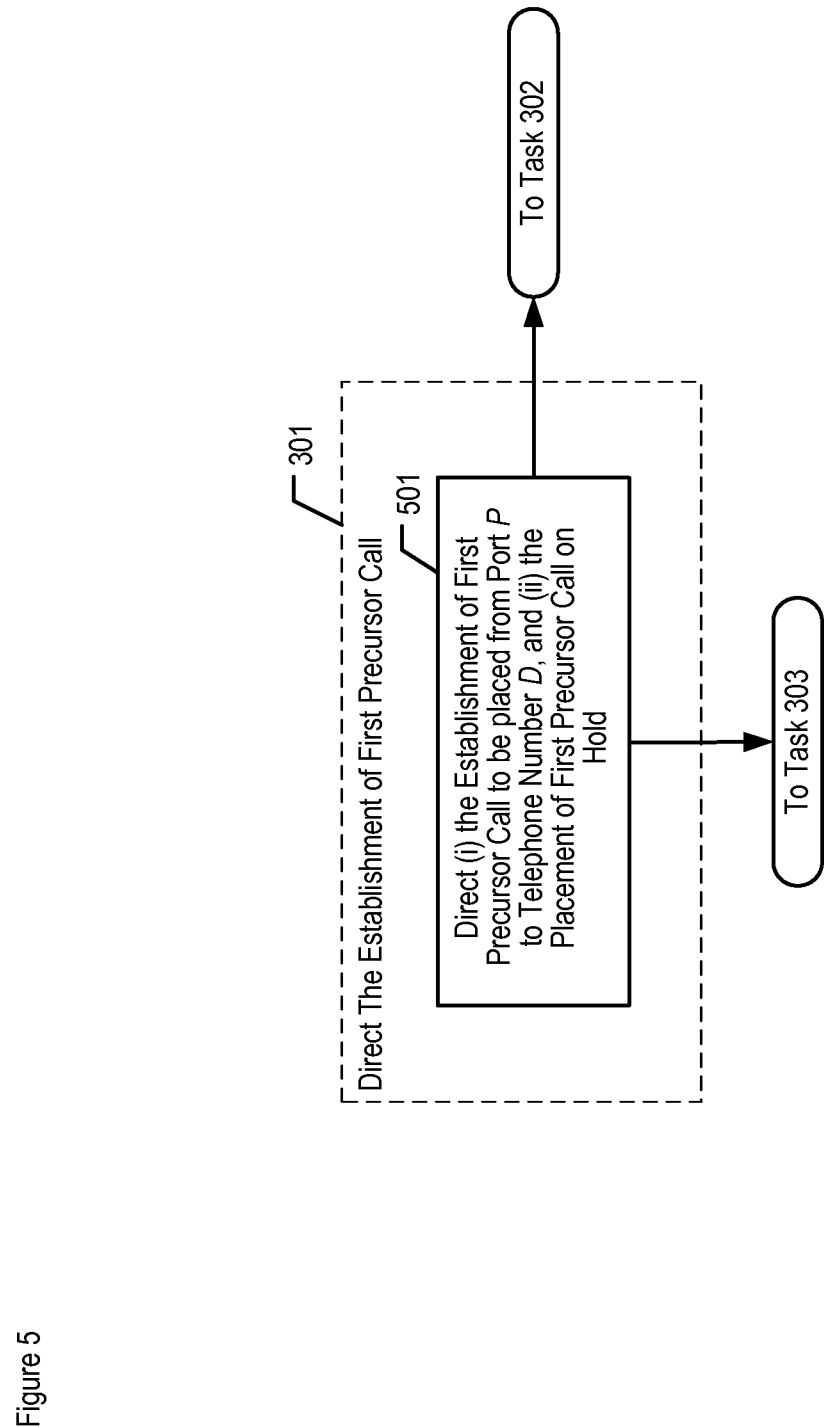
FIG. 5 depicts a flowchart of the salient task performed by the illustrative embodiment in accomplishing task 301.

Direct Establishment of First Precursor Call—FIG. 5 depicts a flowchart of the salient tasks performed by the illustrative embodiment in accomplishing task 301.

At task 501, CTI application 106 determines that a port from pool 107, namely port P, is available to set up one or more precursor calls. Application 106 directs private-branch exchange 104 to: (i) enable a call made to telephone number D to be extended to the telephone number of the affiliated PSTN terminal (i.e., telephone number C); (ii) establish the first precursor call from selected port P to telephone number D; and (iii) place the first precursor call on hold. It will be clear to those skilled in the art how to make and use embodiments of the present invention that accomplish task 301.

Figure 6:
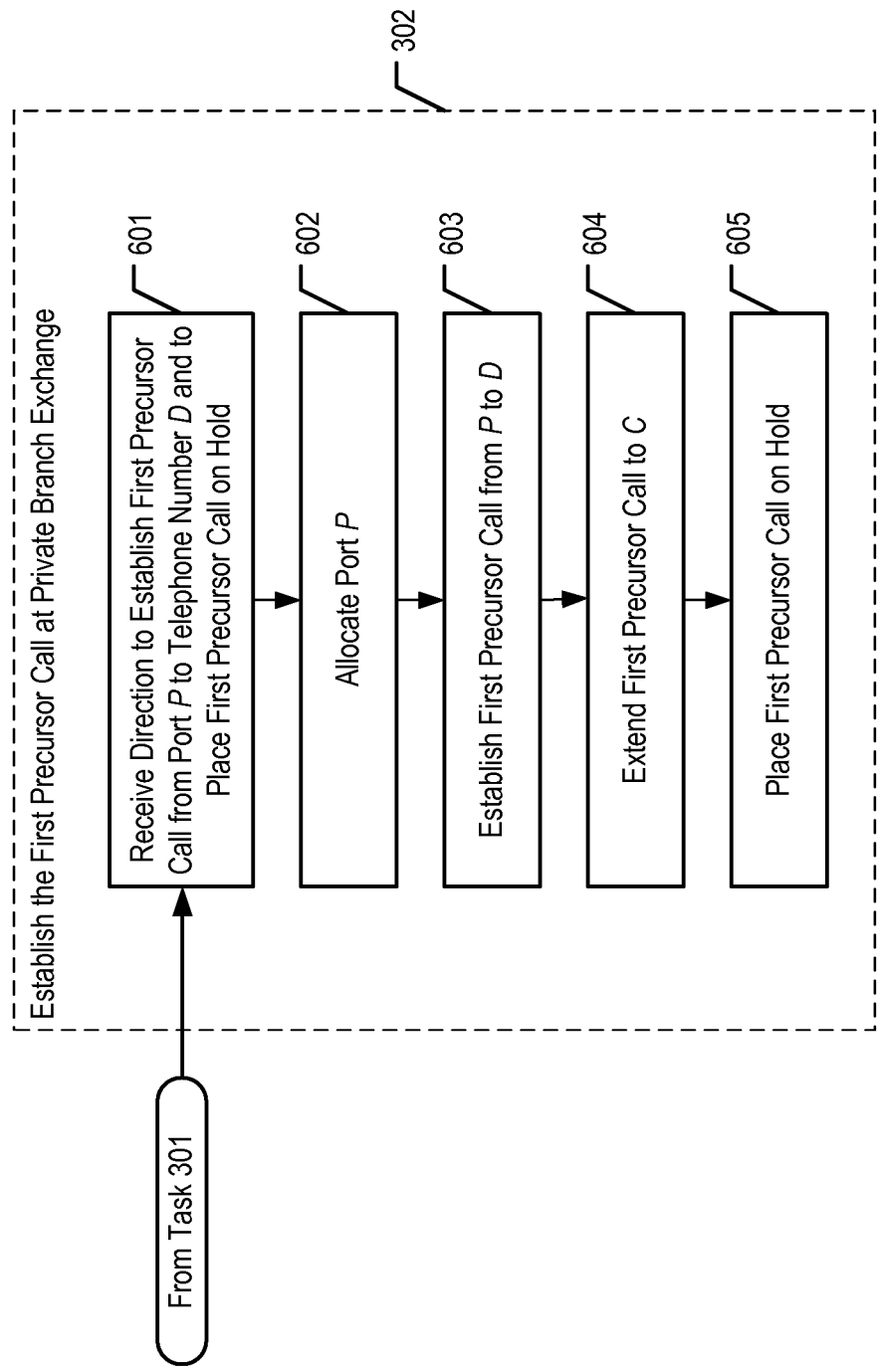
FIG. 6 depicts a flowchart of the salient tasks performed by the illustrative embodiment in accomplishing task 302.

Establish First Precursor Call—FIG. 6 depicts a flowchart of the salient tasks performed by the illustrative embodiment in accomplishing task 302.

At task 601, private-branch exchange 104 is directed by CTI application 106 to establish a first precursor call from selected port P to telephone number D and to place the first precursor call on hold. In accordance with the illustrative embodiment, CTI application 106 directs private-branch exchange 104 to establish the first precursor call.

At task 602, private-branch exchange 104 allocates port P to be used for originating the call to telephone number D.

At task 603, private-branch exchange 104 establishes the first precursor call from port P to telephone number D, in well-known fashion.

At task 604, in response to the call to telephone number D, private-branch exchange 104 extends the first precursor call to telephone number C, in well-known fashion.

At task 605, private-branch exchange 104 places the first precursor call on hold, in well-known fashion.

Figure 7:
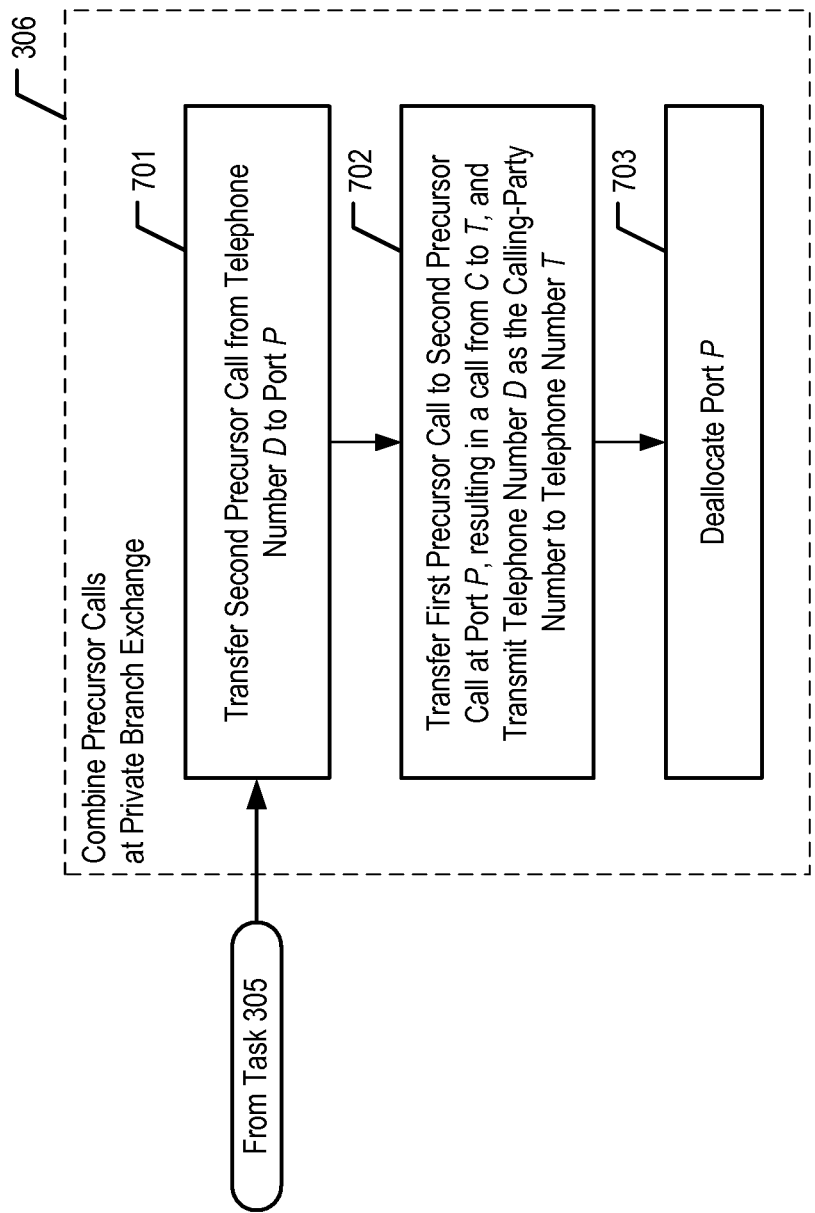
FIG. 7 depicts a flowchart of the salient task performed by the illustrative embodiment in accomplishing task 306.

Combining the Precursor Calls—FIG. 7 depicts a flowchart of the salient task performed by the illustrative embodiment in accomplishing task 306.

At task 701, private-branch exchange 104 transfers the second precursor call from telephone number D to port P, in well-known fashion.

At task 702, private-branch exchange 104 transfers the first precursor call to the second precursor call at port P, to create the resultant call, in well-known fashion. Exchange 104 transmits, as part of the resultant call, telephone number D to telephone number T as the calling party number. Exchange 104 drops port P as a result of the transfer.

In some alternative embodiments, private-branch exchange 104 instead conferences in port P to the call at task 701 to create the resultant call. Then, by the end of task 702, the resultant call comprises the members of both precursor calls, including telephone number D but excepting port P. Private-branch exchange 104 transmits only telephone number D to telephone number T as the calling party number of the resultant call. It will be clear to those skilled in the art how to make and use embodiments of the present invention that accomplish the conferencing, as opposed to the transferring described at task 701.

Furthermore, in some embodiments, terminal 103 indicates to its user the existence of the resultant call. For example, exchange 104 can transmit the indication to terminal 103, or terminal 103 can infer the existence of the resultant call from one or more signals that it received in the course of setting up the resultant call. Upon seeing the indication, the user can then have the call transferred to telephone number D, in well-known fashion.

At task 703, private-branch exchange 104 deallocates port P, thereby enabling the port to be reused to support future calls that are controlled via CTI application 106.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

What is claimed is:

1. A method comprising:
    allocating, by an application server, from a pool of ports at a private branch exchange system, a port P that is capable of emulating a telephone extension, wherein the extension is known only to the application server and to the private branch exchange;
    establishing, by the private branch exchange system, a resultant call between a telephone number T and a telephone number C while transmitting a telephone number D as the calling-party number to the telephone number T; and
    deallocating the port P during the resultant call;
    wherein the telephone number C is associated with the telephone number D in a data structure;
    wherein the telephone number D is within the address space of a private-branch exchange; and
    wherein the resultant call is based on at least one precursor call having been made that includes port P.

2. The method of claim 1 wherein establishing the resultant call comprises:
    (1) establishing a first precursor call from the port P to the telephone number D; and
    (2) establishing a second precursor call from the telephone number D to the telephone number T.

3. The method of claim 2 wherein establishing the resultant call further comprises extending the first precursor call to the telephone number C.

4. The method of claim 3 wherein establishing the resultant call further comprises combining the first precursor call with the second precursor call to generate the resultant call.

5. The method of claim 1 wherein establishing the resultant call comprises directing a first precursor call to be placed from the port P to the telephone number D.

6. The method of claim 5 wherein establishing the resultant call comprises extending the first precursor call to the telephone number C.

7. The method of claim 1 wherein establishing the resultant call comprises:
    (1) enabling a capability that extends calls to the telephone number C that are placed to the telephone number D;
    (2) directing a first precursor call to be established from the port P to the telephone number D; and
    (3) directing a second precursor call to be established from the telephone number D to the telephone number T.

8. The method of claim 7 wherein establishing the resultant call further comprises directing the first precursor call to be transferred to the second precursor call to generate the resultant call.

9. The method of claim 1 wherein the telephone number C is within the address space of the Public Switched Telephone Network.

10. The method of claim 1 further comprising indicating, at a telephone terminal that corresponds to the telephone number D, the existence of the resultant call.

11. A method comprising:
    determining, by an application server, that a port P, at a private branch exchange system, is available for use, wherein the port P is capable of emulating a telephone extension, and wherein the extension is known only to the application server and to the private branch exchange;
    directing, by the application server, (i) a first precursor call to be placed from the port P to a telephone number D, and (ii) the first precursor call to be placed on hold at the port P;
    directing, by the application server, (iii) a second precursor call to be placed from the telephone number D to a telephone number T, and (iv) the first precursor call and the second precursor call to be combined to generate a resultant call while transmitting the telephone number D to the telephone number T as the calling party number of the resultant call; and
    deallocating the port P during the resultant call.

12. The method of claim 11 wherein directing the first precursor call and the second precursor call to be combined comprises (i) directing the second precursor call to be transferred to the port P, and (ii) directing the first precursor call to be transferred to the second precursor call to generate the resultant call.

* * * * *